Patented July 7, 1942

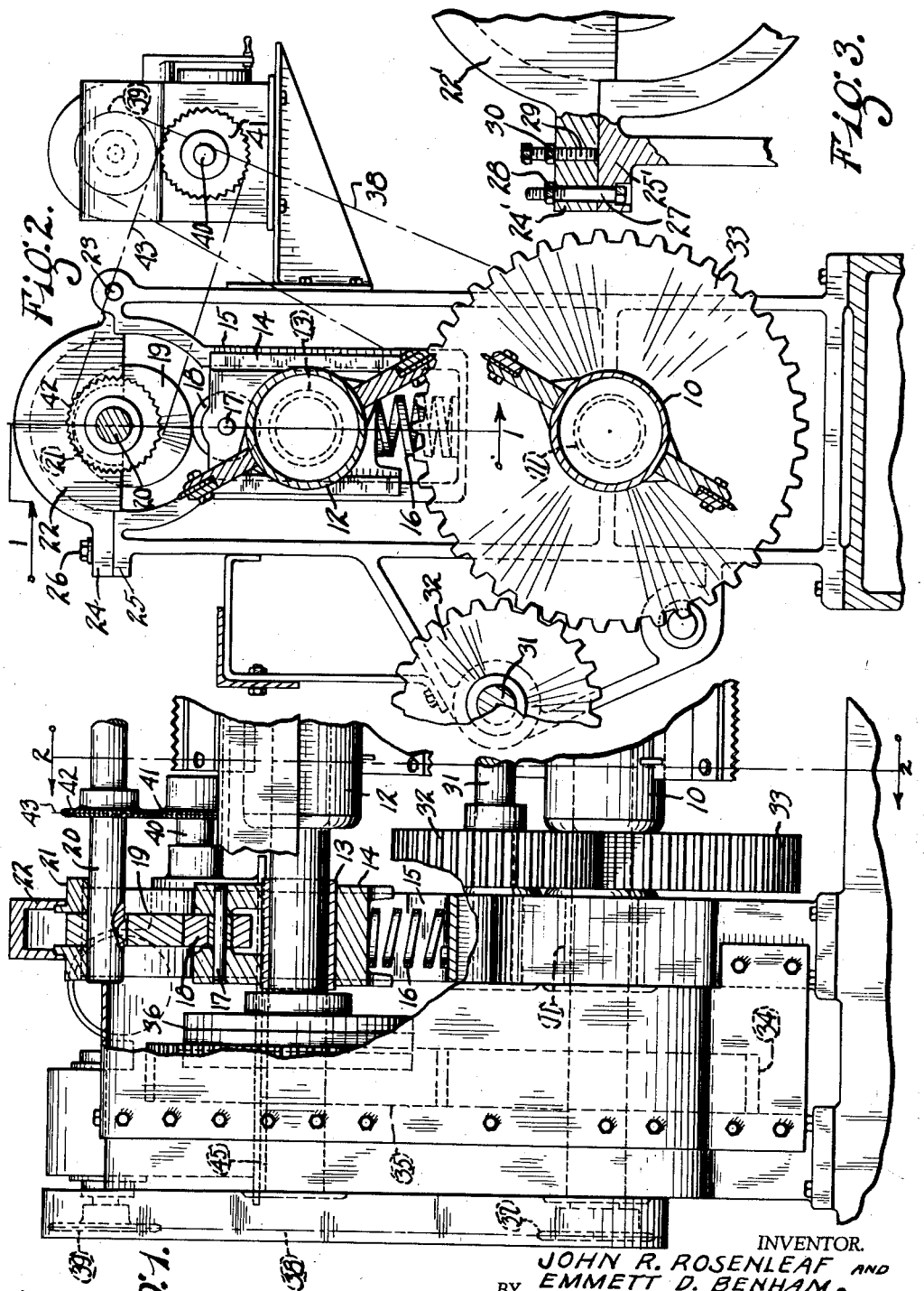

2,288,922

UNITED STATES PATENT OFFICE 2,288,922

CUTOFF MACHINE ADJUSTMENT

John R. Rosenleaf and Emmett D. Benham, Enterprise, Kans., assignors to The J. B. Ehrsam & Sons Manufacturing Company, Enterprise, Kans., a corporation of Kansas Application August 27, 1941, Serial No. 408,426

12 Claims. (Cl. 164—68)

The present invention relates to cut-off machines, and is more particularly concerned with the provision of an adjustment for the control of such a machine which determines the depth of cut. Particularly in the handling of plaster board, it is desirable to provide a machine which will optionally sever the board or merely perforate the board without completely severing, and to provide in such a machine a control through which any desired number of perforating operations may intervene between consecutive severing operations, or any desired number of severing operations may intervene between perforating operations.

Such a machine is the subject matter of our co-pending application Serial No. 366,530, filed November 22, 1940, of which the present application is a continuation-in-part; and the present invention has to do with a refinement of that machine adapting the machine to the handling of materials of varying thicknesses, or to the formation of perforations of varying depths.

To the accomplishment of the above and related objects, our invention may be embodied in the forms illustrated in the accompanying drawing, attention being called to the fact, however, that the drawing is illustrative only, and that change may be made in the specific constructions illustrated and described, so long as the scope of the appended claims is not violated.

Fig. 1 is a fragmental elevation of a machine of the character here under consideration embodying the present invention, parts being shown in section for clarity of illustration;

Fig. 2 is a section taken substantially on the line 2—2 of Fig. 1 and looking in the direction of the arrows; and Fig. 3 is an enlarged fragmental view of a detail, parts being shown in section.

Referring more particularly to the drawing, we have illustrated a cut-off machine comprising a lower rotor 10 journaled in fixed bearings 11 on a machine frame. Only one end of the machine is illustrated, since the two ends are identical for all essential purposes.

In vertical paraxial arrangement, we have illustrated a second, cooperating rotor 12, journaled in bearings 13 which are mounted in bearing carriages 14 which, in turn, are mounted for vertical transaxial reciprocation in the slideways 15 formed in the machine frame, said carriages being supported upon springs 16 which resiliently urge the carriers 14 away from the bearings 11, thus tending to increase the center distance between the rotors 10, 12. Each of the rotors carries one or more knives, as is clearly illustrated in the drawing.

Near their upper ends, the carriages 14 provide mountings for axles 17 upon which are journaled idler rollers 18 with which cooperate eccentric cams 19 keyed to a cam shaft 20. The cam shaft 20 is journaled, adjacent its opposite ends, in half-bearings 21, supported in carriers 22. Each of said carriers 22 is pivoted, as at 23, upon the machine frame, for limited oscillation about an axis parallel with the cam shaft but offset from a line connecting the axis of the cam shaft 20 with either of the rotors 12 and 10. It will be clear from an inspection of Fig. 2 that, as a matter of fact, the axes of rotor 10, the rotor 12, the roller 18, and the cam shaft 20 lie in a common vertical plane.

It will be seen that the cams 19 constitute abutments limiting the transaxial movement of the rotor 12 away from the rotor 10, and that, by rotation of the cam shaft 20, the limiting position defined by the cams 19 is varied. Thus, as the cam shaft 20 is rotated, the rotor 12 will be transaxially reciprocated toward and away from the rotor 10.

To vary the effect of a given position of the cams 19 upon the center distance between rotors 10 and 12, the bearing carrier 22 may be adjusted about its pivotal axis 23. In the form illustrated in Fig. 2, the carrier 22 is formed with a lip 24 registering with a base 25 provided on the machine frame, and a bolt 26 takes through the lip 24 and is threadedly seated in the base 25. In the illustration, the bolt 26 is set down to the limit of its adjustment, so that, with the cams 19 in their illustrated position, the center distance between the rotors 10 and 12 is an absolute minimum. Without changing the rotary position of adjustment of the cam 19, the center distance between the rotors 10 and 12 may be increased by backing off the bolt 26. The springs 16 will cause the bearing carriers 14 to follow up the movement of the camshaft 20 and bearing carrier 22, to hold the lip 24 in contact with the head of the bolt 26 as the bolt is backed off, thereby increasing the above-mentioned center distance.

As an alternative construction, we have shown in Fig. 3 a bearing carrier 22' having a lip 24' cooperating with a base 25' on the machine frame. A bolt 27 passes through registering apertures in the base 25' and lip 24' and receives a nut 28. The nut 28, in the illustration, is turned down to its limiting position providing a minimum center distance between the rotors. To increase that center distance, the lock nut 30 upon a shifting screw 29 threadedly penetrating the lip 24', may be relaxed, and the nut 28 may be relaxed, whereafter the screw 29 may be turned down to force the lip 24 upwardly by engagement with the base 25'. After the carrier 22' has reached its desired position of adjustment, the nuts 28 and 30 may be retightened.

While the surrounding parts of the above-described invention are immaterial to the actual invention, it may be noted that the machine is driven through a countershaft 31 carrying a pinion 32 meshing with pinion 33 on rotor 10, and that an extension of the rotor 10 carries a gear 34 meshing with gear 35 on a stub shaft 45 journaled in the machine frame. Said shaft 45 is connected, through an "Oldham" coupling 36 to the rotor 12. The projection of the rotor 10 likewise carries a sprocket 37 driving, through chain 38, to a sprocket 39 on the input shaft of a selective speed transmission; and a sprocket 41 on the output shaft 40 of said transmission drives, through chain 43, the sprocket 42 on the cam shaft 20.

We claim as our invention:

1. In a cut-off machine, a lower knife-carrying rotor, an upper knife-carrying rotor, spring means supporting the latter, a shaft, means carried by said shaft and forming an abutment for limiting the upward movement of said upper rotor under the influence of said spring, a bearing for said shaft, and means for adjusting the distance between the axes of said shaft and said lower rotor.

2. In a cut-off machine, a lower knife-carrying rotor, an upper knife-carrying rotor, spring means supporting the latter, a cam shaft providing an abutment for variably limiting the separation of said rotors, and means for adjusting the position of the axis of said cam shaft with respect to that of the lower rotor.

3. In a cut-off machine, a lower knife-carrying rotor, an upper knife-carrying rotor, spring means supporting the latter, a shaft, a cam on said shaft forming an abutment for limiting the upward movement of said upper rotor under the influence of said spring, said cam being rotatable to vary the center distance between said rotors, and means for varying the effect upon the center distance between said rotors of a given position of rotary adjustment of said cam.

4. In a cut-off machine, a frame, a knife-carrying rotor journalled in fixed bearings in said frame, a second knife-carrying rotor journalled in bearings slidably mounted in said frame for movement toward and away from said first-named bearings, a cam shaft cooperative with said last-named bearings, and means on said frame providing a journal mounting for said cam shaft and adjustable to vary the position of the axis of said cam shaft with respect to that of said first-named rotor.

5. In a cut-off machine, a frame, a knife-carrying rotor journalled in fixed bearings in said frame, a second knife-carrying rotor journalled in bearings slidably mounted in said frame for movement toward and away from said first-named bearings, a cam shaft cooperative with said last-named bearings, and bearing means for said cam shaft pivotally adjustably mounted on said frame for oscillation about an axis substantially parallel with the axis of said cam shaft.

6. In a cut-off machine, a frame, a knife-carrying rotor mounted in fixed bearings on said frame, a slideway on said frame, bearings reciprocably mounted in said slideway for movement in a line included in an axial plane of said first rotor, a second knife-carrying rotor journalled in said last-named bearings with its axis lying in said plane, a cam shaft having its axis disposed in said plane, cam means on said shaft cooperating with said reciprocable bearings to determine the center distance between said rotors, and means adjustably mounted on said frame and supporting said cam shaft to make its axis adjustable with respect to the axis of said first-named rotor.

7. In a cut-off machine, a frame, a knife-carrying rotor mounted in fixed bearings on said frame, a slideway on said frame, bearings reciprocably mounted in said slideway for movement in a line included in an axial plane of said first rotor, a second knife-carrying rotor journalled in said last-named bearings with its axis lying in said plane, spring means supporting said reciprocable bearings and urging them away from the axis of said first-named rotor, a cam shaft having its axis disposed in said plane, cam means on said shaft limiting the movement of said bearings under the influence of said springs, and means adjustably mounted on said frame and supporting said cam shaft to make its axis adjustable with respect to the axis of said first-named rotor.

8. In a cut-off machine, a frame, a knife-carrying rotor mounted in fixed bearings on said frame, a slideway on said frame, bearings reciprocably mounted in said slideway for movement in a line included in an axial plane of said first rotor, a second knife-carrying rotor journalled in said last-named bearings with its axis lying in said plane, spring means supporting said reciprocable bearings, a cam shaft having its axis disposed in said plane, cam means on said shaft limiting the movement of said bearings under the influence of said springs, and means adjustably mounted on said frame and supporting said cam shaft to make its axis adjustable with respect to the axis of said first-named rotor.

9. In a cut-off machine, a knife-carrying rotor journalled in fixed bearings, a second knife-carrying rotor substantially parallel with said first-named rotor and mounted for transaxial reciprocation toward and away from said first-named rotor, spring means biasing said second rotor toward transaxial movement in one direction, a shaft substantially parallel with said rotors, cam means on said shaft forming an abutment for adjustably limiting the movement of said second rotor under the influence of said spring means, and bearing means for said shaft comprising a half-bearing and a carrier therefor, said carrier being pivoted for oscillable adjustment about an axis offset from a line joining the axis of said shaft with the axis of either of said rotors.

10. In a cut-off machine, a knife-carrying rotor journalled in fixed bearings, a second knife-carrying rotor substantially parallel with said first-named rotor and mounted for transaxial reciprocation toward and away from said first-named rotor, spring means biasing said second rotor toward transaxial movement in one direction, a shaft substantially parallel with said rotors, cam means on said shaft forming an abutment for adjustably limiting the movement of said second rotor under the influence of said spring means, bearing means for said shaft comprising a half-bearing and a carrier therefor, said carrier being pivoted for oscillable adjustment about an axis offset from a line joining the axis of said shaft with the axis of either of said rotors, and threaded means for adjustably positioning said carrier about its pivotal axis.

11. In a cut-off machine, a knife-carrying rotor journalled in fixed bearings, a second knife-carrying rotor substantially parallel with said first-named rotor and mounted for transaxial reciprocation toward and away from said first-named rotor, spring means biasing said second rotor toward transaxial movement in one direction, a shaft substantially parallel with said rotors, cam means on said shaft forming an abutment for adjustably limiting the movement of said second rotor under the influence of said spring means, bearing means for said shaft comprising a half-bearing and a carrier therefor, said carrier being pivoted for oscillable adjustment about an axis offset from a line joining the axis of said shaft with the axis of either of said rotors, and threaded means operable to shift said carrier about its pivotal axis in a direction resisted by said spring means.

12. In a cut-off machine, a knife-carrying rotor journalled in fixed bearings, a second knife-carrying rotor substantially parallel with said first-named rotor and mounted for transaxial reciprocation toward and away from said first-named rotor, spring means biasing said second rotor toward transaxial movement in one direction, a shaft substantially parallel with said rotors, cam means on said shaft forming an abutment for adjustably limiting the movement of said second rotor under the influence of said spring means, bearing means for said shaft comprising a half-bearing and a carrier therefor, said carrier being pivoted for oscillable adjustment about an axis offset from a line joining the axis of said shaft with the axis of either of said rotors, threaded means operable to shift said carrier about its pivotal axis in a direction resisted by said spring means, and separate threaded means operable to shift said carrier in the opposite direction.

JOHN R. ROSENLEAF.
EMMETT D. BENHAM.